(12) United States Patent
Kong et al.

(10) Patent No.: US 12,235,945 B2
(45) Date of Patent: Feb. 25, 2025

(54) ACOUSTIC-BASED FACE ANTI-SPOOFING SYSTEM AND METHOD

(71) Applicant: City University of Hong Kong, Hong Kong (CN)

(72) Inventors: Chenqi Kong, Hong Kong (CN); Kexin Zheng, Hong Kong (CN); Haoliang Li, Hong Kong (CN); Shiqi Wang, Hong Kong (CN)

(73) Assignee: City University of Hong Kong, Hong Kong (CN)

(*) Notice: Subject to any disclaimer, the term of this patent is extended or adjusted under 35 U.S.C. 154(b) by 298 days.

(21) Appl. No.: 18/057,259

(22) Filed: Nov. 21, 2022

(65) Prior Publication Data
US 2024/0169042 A1    May 23, 2024

(51) Int. Cl.
*G06F 21/32*    (2013.01)
*G06F 18/10*    (2023.01)
*G06F 18/2131*    (2023.01)

(52) U.S. Cl.
CPC .............. *G06F 21/32* (2013.01); *G06F 18/10* (2023.01); *G06F 18/2131* (2023.01); *G06F 2221/2127* (2013.01)

(58) Field of Classification Search
CPC ...... G06F 18/10; G06F 18/2131; G06F 21/32; G06F 2221/2127; G06V 10/82; G06V 40/168; G06V 10/806; G06V 40/45; G06V 10/478; G06V 10/454
See application file for complete search history.

(56) References Cited

U.S. PATENT DOCUMENTS

| 10,552,712 B2* | 2/2020 | Shen ..................... G06V 40/171 |
| 2016/0097716 A1* | 4/2016 | Gulati ................... A61B 5/1495 250/340 |
| 2016/0371555 A1* | 12/2016 | Derakhshani ........... G01S 15/89 |

(Continued)

OTHER PUBLICATIONS

W. Xu et al., "Rface: Anti-spoofing facial authentication using cots rfid," in Proceedings of IEEE INFOCOM 2021—IEEE Conference on Computer Communications, IEEE, 2021, pp. 1-10.

(Continued)

*Primary Examiner* — Daniel L Murphy
*Assistant Examiner* — Amie M Ndure
(74) *Attorney, Agent, or Firm* — S&F/WEHRW

(57) ABSTRACT

Two-dimensional face presentation attacks are one of most notorious and pervasive face spoofing types, causing security issues to facial authentication systems. To tackle these issues, a cost-effective face anti-spoofing (FAS) system based on acoustic modality, named as Echo-FAS, is devised, which employs a crafted acoustic signal to probe the presented face. First, a large-scale, high-diversity, acoustic-based FAS database, named as Echo-Spoof, is built. Based upon Echo-Spoof, we design a two-branch framework combining global and local frequency features of the presented face to distinguish live vs. spoofing faces. Echo-FAS has the following merits: (1) it only needs one speaker and one microphone; (2) it can capture three-dimensional geometrical information of the presented face and achieve a remarkable FAS performance; and (3) it can be handily allied with RGB-based FAS models to mitigate the overfitting problem in the RGB modality and make the FAS model more accurate and robust.

20 Claims, 9 Drawing Sheets

(56) References Cited

U.S. PATENT DOCUMENTS

| | | | | |
|---|---|---|---|---|
| 2018/0033263 A1* | 2/2018 | Novich | ................... | G06F 3/016 |
| 2020/0218793 A1* | 7/2020 | Storm | .................... | G06V 40/18 |
| 2020/0309930 A1 | 10/2020 | Zhou et al. | | |
| 2021/0056292 A1* | 2/2021 | Mao | ....................... | G06N 3/045 |
| 2021/0169417 A1* | 6/2021 | Burton | ................ | A61B 5/4857 |
| 2021/0207974 A1* | 7/2021 | Zhou | .................... | G01C 21/206 |
| 2022/0026531 A1* | 1/2022 | Wu | ........................ | G01S 13/88 |

OTHER PUBLICATIONS

H. Chen, W. Wang, J. Zhang, and Q. Zhang, "Echoface: Acoustic sensor-based media attack detection for face authentication," IEEE Internet of Things Journal, vol. 7, No. 3, pp. 2152-2159, 2019.

B. Zhou, Z. Xie, Y. Zhang, J. Lohokare, R. Gao, and F. Ye, "Robust human face authentication leveraging acoustic sensing on smartphones," IEEE Transactions on Mobile Computing, vol. 21, issue 8, pp. 3009-3023, Aug. 2022.

A. Vaswani et al., "Attention is All you Need," in Proceedings of Advances in Neural Information Processing Systems 30 (NIPS 2017).

R. Weng et al., "GRET: Global Representation Enhanced Transformer," in Proceedings of The Thirty-Fourth AAAI Conference on Artificial Intelligence (AAAI-20), pp. 9258-9265, Feb. 24, 2020.

\* cited by examiner

ACOUSTIC-BASED FACE ANTI-SPOOFING SYSTEM AND METHOD

LIST OF ABBREVIATIONS 2D two-dimensional
3D three-dimensional
CNN convolutional neural network
FAS face anti-spoofing
FFT fast Fourier transform
FMCW frequency-modulated continuous wave
FT Fourier transform
RFID Radio Frequency Identification
RGB red, green, blue
SNR signal-to-noise ratio
STFT short-time Fourier transform

TECHNICAL FIELD

The present invention generally relates to FAS based on using an acoustic signal to probe a presented face. Particularly, the present invention relates to an acoustic-based FAS technique for detecting liveness of the presented face based on an enriched frequency feature obtained by combining global and local frequency features of the presented face.

BACKGROUND

Face recognition can provide a user-friendly authentication mechanism in many application scenarios, notably in user authentication of smartphones. 2D face presentation attacks are one of the most notorious and pervasive face spoofing types, which have caused pressing security issues to facial authentication systems. While RGB-based FAS models have been proven to counter the face spoofing attack effectively, most existing FAS models suffer from the overfitting problem (i.e. lacking of generalization capability) such that these FAS models are usually computationally expensive. In the art, many FAS models have been devoted to capturing auxiliary information (e.g., depth and infrared maps) to achieve a more robust face liveness detection performance. These methods, however, require expensive sensors and cost extra hardware to capture the specific modality information, limiting their applications in practical scenarios. For instance, RFace [1] uses a RFID tag array to perform face authentication and face anti-spoofing synchronously, although RFace achieves a desired authentication success rate and a spoofing attack detection performance, Acoustic-based FAS techniques are attractive in that relatively inexpensive sensors and audio-signal generators, e.g., microphones and speakers, may be used. EchoFace [2] turns a device equipped with one speaker and two microphones into an active sonar to detect spatial structures of a target, namely, a face. The speaker emits a well-designed signal, and meanwhile, the two microphones collect plural reflection signals. EchoFace implemented in a smartphone extracts the target signals from the two reflected signal segments collected by the earpiece microphone and bottom microphone to perform spoofing attack detection. However, its performance deteriorates when the bottom microphone cannot sense the signal well in many practical scenarios. Note that face authentication and FAS are different. Although EchoPrint [3], [4] combines facial features obtained by an audio signal and by imaging for secure authentication, face spoofing detection is largely ignored in EchoPrint.

There is a need in the art for an acoustic-based FAS technique with improvement in FAS performance.

SUMMARY

A first aspect of the present invention is to provide a method for detecting liveness of a presented face. Detecting liveness of the presented face is essential in determining whether the presented face is a physical human face or a spoofer.

The method comprises: generating a first acoustic signal and projecting the generated first acoustic signal onto the presented face for probing the presented face, wherein the first acoustic signal comprises a plurality of time-limited chirps, causing a face-echo signal to be reflected from the presented face when the presented face receives an individual time-limited chirp, whereby a plurality of face-echo signals is created for the plurality of time-limited chirps; receiving a second acoustic signal for capturing an acoustic response of the presented face due to the first acoustic signal, wherein the plurality of face-echo signals is embedded in the second acoustic signal; preprocessing the received second acoustic signal to yield a plurality of extracted signal segments, wherein the preprocessing of the second acoustic signal includes extracting the plurality of face-echo signals from the received second acoustic signal such that an individual extracted signal segment contains a corresponding face-echo signal; applying a FT to the individual extracted signal segment to yield a frequency segment, whereby a plurality of frequency segments for the plurality of extracted signal segments is obtained; processing the plurality of frequency segments with a machine-learning transformer model to yield a global frequency feature of the presented face; applying a STFT to the plurality of extracted signal segments to yield a spectrogram; processing the spectrogram with a CNN to yield a local frequency feature of the presented face; and combining the global and local frequency features to yield an enriched feature of the presented face for determining whether the presented face is a genuine face or a spoofer.

Preferably, the FT is realized by a FFT.

In certain embodiments, the individual time-limited chirp has a bandwidth of 5 kHz.

In certain embodiments, the plurality of time-limited chirps collectively covers a frequency span from 12 kHz to 21 kHz. The individual time-limited chirp may have a frequency sweep range selected from a first range of 12-17 kHz, a second range of 14-19 kHz, and a third range of 16-21 kHz.

It is preferable that in extracting the plurality of face-echo signals from the received second acoustic signal, one or more noise components are removed from the second acoustic signal while keeping the plurality of face-echo signals in the second acoustic signal. In certain embodiments, the one or more noise components include: a first portion of the first acoustic signal as directly transmitted from a sound generator to a sound receiver without visiting the presented face, the sound generator being used to emit the first acoustic signal, the sound receiver being used to receive the second acoustic signal; and a second portion of the first acoustic signal as reflected from objects far away from the presented face.

Preferably, the first acoustic signal further comprises a pilot for assisting time synchronization in processing the second acoustic signal, where the pilot is transmitted before the plurality of time-limited chirps in the first acoustic signal. In addition, the preprocessing of the second acoustic signal further includes performing time synchronization with the received second acoustic signal by locating the pilot in the second acoustic signal.

In certain embodiments, the method further comprises: training the transformer model with a training database before the transformer model processes the plurality of frequency segments; and training the CNN with the training database before the CNN processes the spectrogram.

A second aspect of the present invention is to provide a FAS system for detecting liveness of a presented face.

The system comprises a sound generator, a sound receiver, and one or more computing processors. The sound generator is used for generating a first acoustic signal and projecting the generated first acoustic signal onto the presented face for probing the presented face. The sound receiver is used for receiving a second acoustic signal for capturing an acoustic response of the presented face due to the first acoustic signal. The one or more computing processors are communicable with the sound generator and the sound receiver. The one or more computing processors are configured to: control the sound generator to generate the first acoustic signal for projection to the presented face, wherein the first acoustic signal comprises a plurality of time-limited chirps, causing a face-echo signal to be reflected from the presented face when the presented face receives an individual time-limited chirp, whereby a plurality of face-echo signals is created for the plurality of time-limited chirps, and the plurality of face-echo signals is embedded in the second acoustic signal; receive the second acoustic signal from the sound receiver; preprocess the received second acoustic signal to yield a plurality of extracted signal segments, wherein the preprocessing of the received second acoustic signal includes extracting the plurality of face-echo signals from the received second acoustic signal such that an individual extracted signal segment contains a corresponding face-echo signal; apply a FT to the individual extracted signal segment to yield a frequency segment, whereby a plurality of frequency segments for the plurality of extracted signal segments is obtained; process the plurality of frequency segments with a machine-learning transformer model to yield a global frequency feature of the presented face; apply a STFT to the plurality of extracted signal segments to yield a spectrogram; process the spectrogram with a CNN to yield a local frequency feature of the presented face; and combine the global and local frequency features to yield an enriched feature of the presented face for determining whether the presented face is a genuine face or a spoofer.

Preferably, the FT is realized by a FFT.

In certain embodiments, the individual time-limited chirp has a bandwidth of 5 kHz.

In certain embodiments, the plurality of time-limited chirps collectively covers a frequency span from 12 kHz to 21 kHz. The individual time-limited chirp may have a frequency sweep range selected from a first range of 12-17 kHz, a second range of 14-19 kHz, and a third range of 16-21 kHz.

It is preferable that in extracting the plurality of face-echo signals from the received second acoustic signal, one or more noise components are removed from the second acoustic signal while keeping the plurality of face-echo signals in the second acoustic signal. In certain embodiments, the one or more noise components include: a first portion of the first acoustic signal as directly transmitted from a sound generator to a sound receiver without visiting the presented face, the sound generator being used to emit the first acoustic signal, the sound receiver being used to receive the second acoustic signal; and a second portion of the first acoustic signal as reflected from objects far away from the presented face.

Preferably, the first acoustic signal further comprises a pilot for assisting time synchronization in processing the second acoustic signal, where the pilot is transmitted before the plurality of time-limited chirps in the first acoustic signal. In addition, the preprocessing of the second acoustic signal further includes performing time synchronization with the received second acoustic signal by locating the pilot in the second acoustic signal.

In certain embodiments, the one or more computing processors are further configured to: train the transformer model with a training database before the transformer model processes the plurality of frequency segments; and train the CNN with the training database before the CNN processes the spectrogram.

The FAS system may be implemented in a smartphone such that the smartphone comprises the FAS system. In the smartphone, the sound generator is realized by one or more speakers, and the sound receiver is realized by one or more microphones. In certain embodiments, the sound generator is a single speaker, and the sound receiver is a single microphone.

Other aspects of the present disclosure are disclosed as illustrated by the embodiments hereinafter.

Skilled artisans will appreciate that elements in the figures are illustrated for simplicity and clarity and have not necessarily been depicted to scale.

DETAILED DESCRIPTION

In the present invention, an acoustic-based FAS technique is disclosed. The technique is illustrated by describing an exemplary acoustic-based FAS system intended for use with a smartphone. For convenience, the system is herein referred to as Echo-FAS. Based on the disclosure of Echo-FAS, embodiments of the technique are further elaborated and detailed.

A. Exemplary Acoustic-Based FAS System for Smartphone

Figure 1:
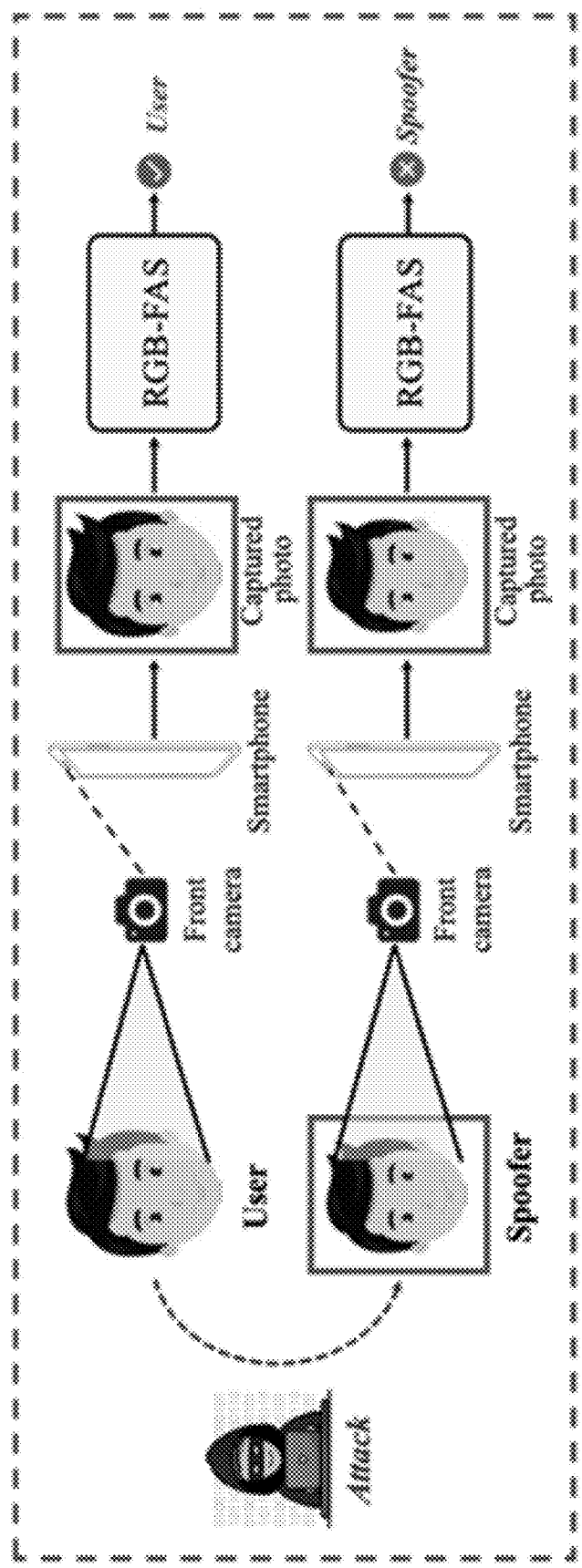
FIG. 1 depicts a schematic diagram of a traditional RGB-based FAS system.

For comparison with Echo-FAS, FIG. 1 depicts a conventional RGB-based system implemented in a smartphone for FAS. One or more images of a presented face are captured by a camera installed in the smartphone. Visual information contained in the one or more images are subsequently used to determine liveness of the presented face.

Figure 2:
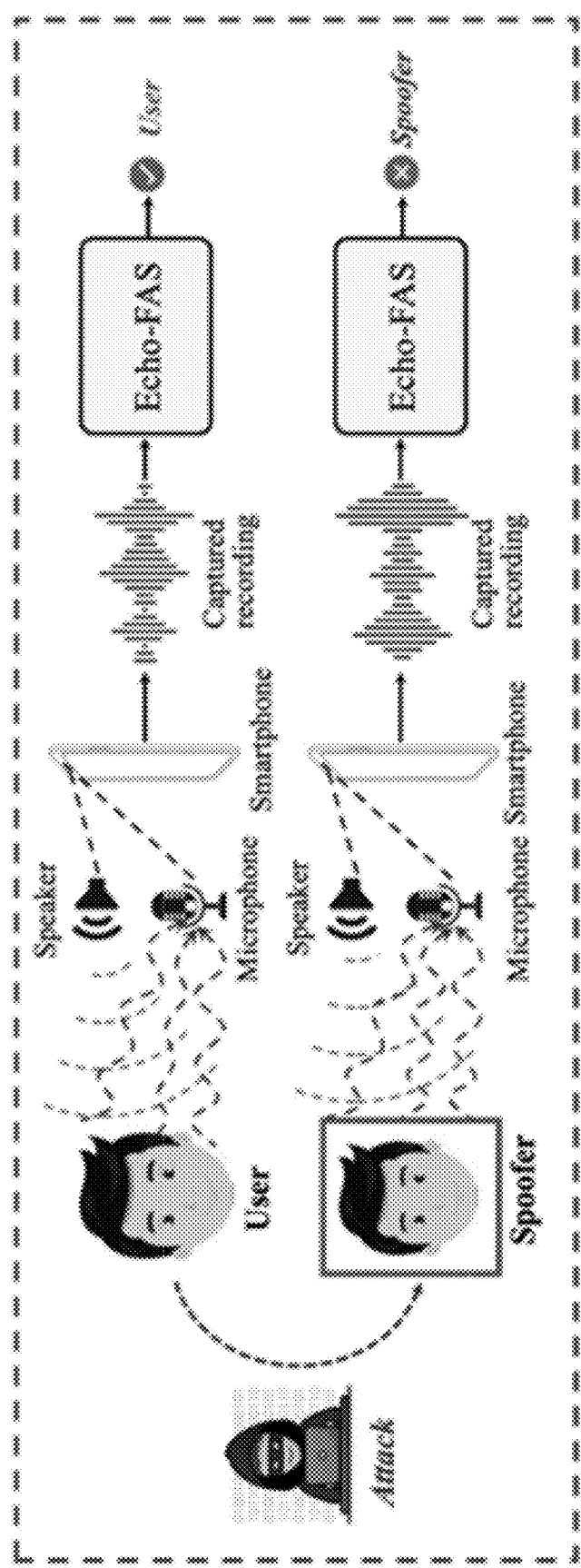
FIG. 2 depicts a schematic diagram of an exemplary acoustic-based FAS system, Echo-FAS, realized in a smartphone.

FIG. 2 depicts a schematic diagram of an exemplary Echo-FAS system realized by a smartphone. Unlike the RGB-based system, which leverages a front camera to capture input vision data, the Echo-FAS system uses an available speaker to emit a customized crafted acoustic signal and leverages a microphone to collect a reflected recording that has been modulated by the input live/spoof face, where the microphone and the speaker are installed in the smartphone. The disclosed acoustic-based FAS technique extracts feature representatives from the captured recording with rich geometric information to distinguish genuine faces and spoofing faces.

Different from EchoFace [2], Echo-FAS only requires one front speaker and one microphone used as a data collection sensor. Such arrangement is ubiquitous on most smartphones. Echo-FAS is cost-effective and can be readily deployed on commercial mobile computing devices. In addition, Echo-FAS takes advantage of data-driven methods such as CNN and transformer architectures for conducting more secure and robust face liveness detection.

A.1. Acoustic Signal Design for FAS

Figure 3:
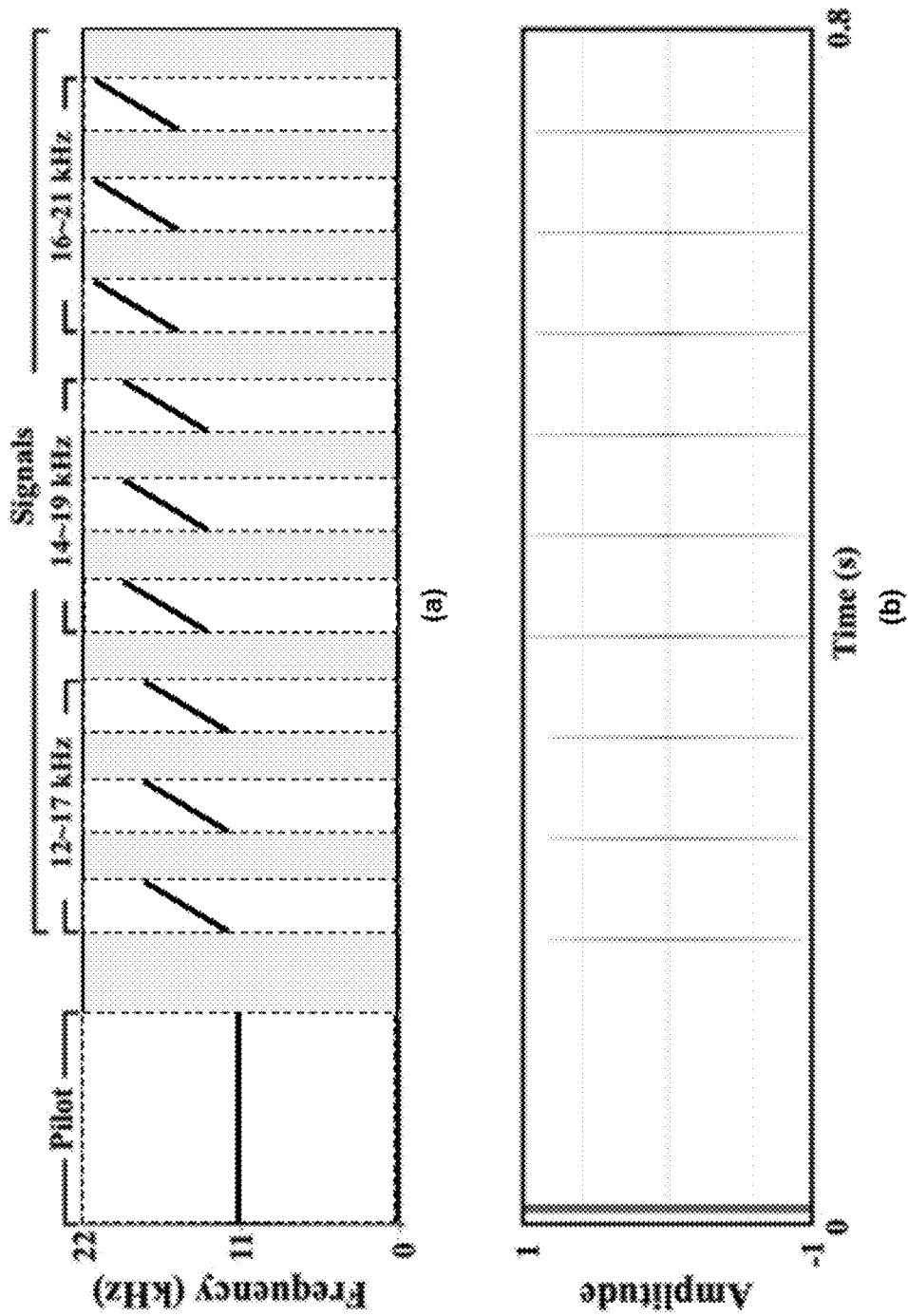
FIG. 3 illustrates a signal design for Echo-FAS with frequency and amplitude plots of a designed acoustic signal used in Echo-FAS for probing a presented face.

FIG. 3 illustrates a signal design for Echo-FAS. Particularly, FIG. 3 depicts frequency and amplitude plots of a designed acoustic signal used in the Echo-FAS system for probing a presented face. The whole signal duration is around 0.8 seconds. The sample rate of the designed signal is 44.1 kHz as it is most commonly supported for Android phones. The highest frequency that smartphones can sense is around 22 kHz. Therefore, we add a 250-sample 11.025 kHz pilot at a front part of the designed signal and set the interval between the pilot and the first chirp as 8,000 samples (i.e. ~0.18 s). The signals following the pilot, including nine chirps with three different frequency sweep ranges, cover a frequency range from 12 kHz to 21 kHz. The signal chirp at each group covers the corresponding frequency range in a linearly-increasing manner and repeats three times in a finally emitted signal (namely, the designed signal). Each chirp consists of 60 samples, corresponding to ~1.4 ms at 44.1 kHz sample rate. The interval between two chirps is designed as 3000 samples, corresponding to ~68 ms for a sample rate of 44.1 kHz.

The above-described design of the signal has considered some fundamental properties. First, the signal should carry rich and distinct geometric information from the target face region for high-quality anti-spoofing. Second, it should be reasonably robust to ambient noise and support accurate localization of target face reflection. Lastly, the emitted signal should produce a minimum annoyance to human ear to ensure a good user experience.

Echo-FAS adopts a frequency chirp, which is a FMCW, in probing the presented face for advantages of capturing minute details of the face as inspired by EchoPrint [4]. In the FMCW technique, the echo separating resolution depends on the bandwidth of the chosen signal, which is set as 5 kHz in our design.

As indicated in [4], the ambient noise frequency is usually under 8 kHz. High frequency (at least higher than 8 kHz) is desirable for annoyance control and ambient noise removal. Since the emitted signal performs poorly when the frequency range exceeds 20 kHz due to mobile hardware limitations, the target frequency ranges for probing the presented face is selected to be 12 kHz to 21 kHz. This range is divided it into 12-17 kHz, 14-19 kHz, and 16-21 kHz. Since it is challenging to locate target face reflection signals in the captured recording accurately as a result that delays between the microphone and speaker are not consistent across smartphones, the 11.025 kHz continuous pilot signal at the beginning of signal emission is adopted. The selection of this pilot frequency is to avoid the ambient noise and the frequency range of the probing signal that probes the face.

Selecting the length of each chirp to be ~1.4 ms is a balance between the following two opposite needs. A longer chirp is desirable in that it enables more energy to be collected at different frequencies. However, if the chirp duration is too long, the directly transmitted signal from the speaker to the microphone could overlap with echoes from the nearby face region in the recording.

Similarly, the selection of the chirp interval (~68 ms) is a tradeoff between selecting a longer interval between two successive chirps and selecting a shorter one. Regarding the chirp interval, a shorter interval can save the sensing time. However, it might harm the quality of face echoes because echoes from far-away objects could mix with the face echoes in the final recording.

A.2. Data Acquisition

We first explain the motivation of developing an Echo-Spoof database where the database has the desired properties of being acoustic-based, large-scale and of high diversity.

Being acoustic-based. Unlike most existing FAS databases that collect face images and videos, the Echo-Spoof database collects acoustic signals that contain rich geometric information of user faces to perform face liveness detection in a more privacy-preserving way.

Being large-scale. The Echo-Spoof database is collected from 30 volunteers (15 females and 15 males), containing more than 250,000 acoustic signal segments.

Being high-diversity. To accommodate unlimited variations of environmental conditions in real-world application scenarios, we set various environmental variables in the data collection process, such as collection distances, devices, ambient noise levels, and pitches.

Figure 4:
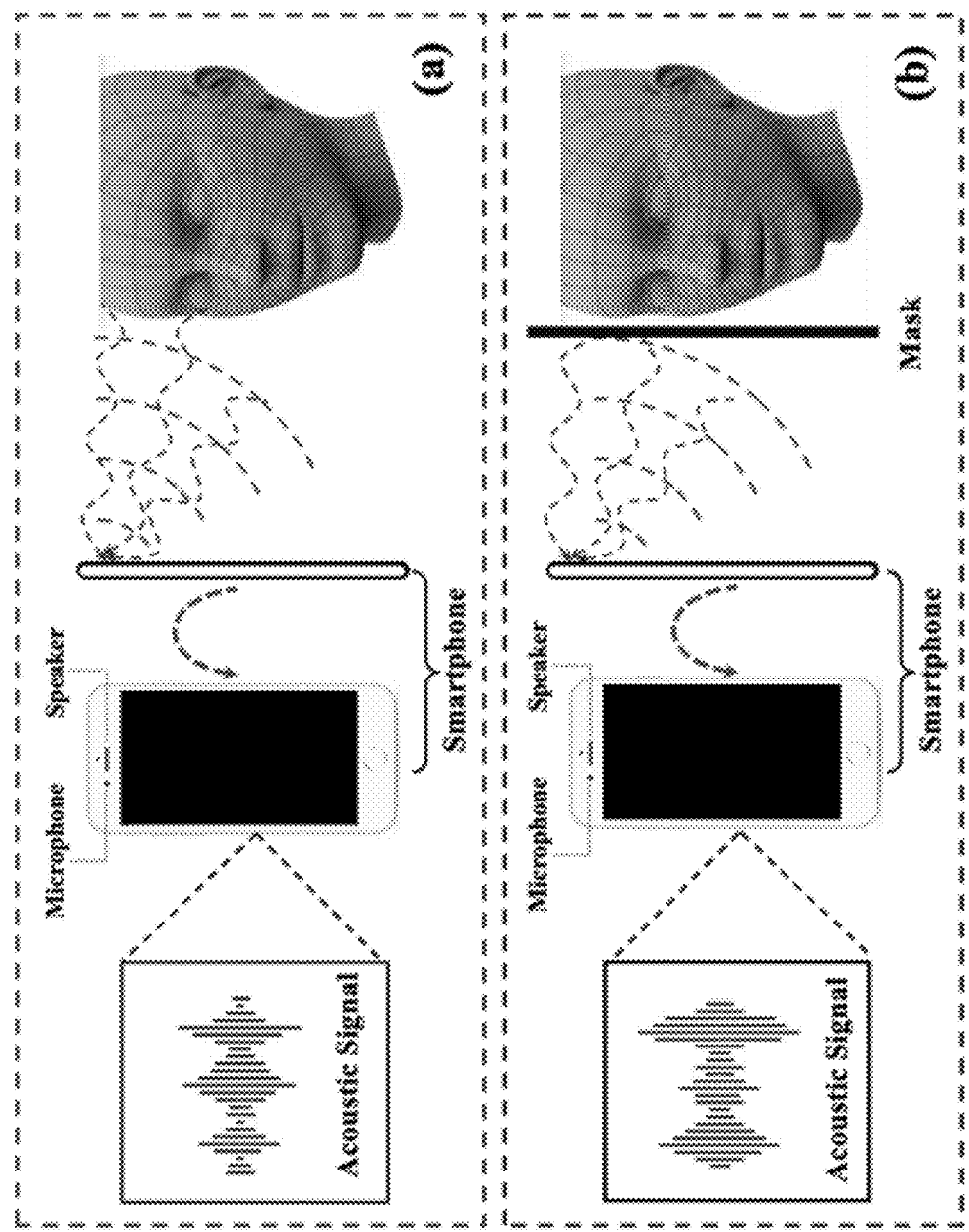
FIG. 4 illustrates an Echo-FAS dataset collection process, where subplots (a) and (b) therein illustrate live/genuine face and spoofing face data collection processes, respectively.

FIG. 4 illustrates an Echo-FAS dataset collection process, where subplots (a) and (b) of FIG. 4 illustrate live/genuine face and spoofing face data collection processes, respectively. The earpiece speaker first emits the designed acoustic signal. The emitted signal is then modulated by the surface of the live/spoof face. The reflected signal carrying rich geometric information of the live/spoof face is collected by the top microphone of the smartphone.

To handle complex attack environments and generalize to real-world scenarios, we build a large-scale and high-diversity acoustic database, Echo-Spoof. We consider the following application variables during the database collection process.

Device. We conduct data collections on four Android smartphone devices: Samsung s9, Samsung s21, Samsung edge note, and Xiaomi Redmi7. Generally speaking, different smartphones have different hardware conditions due to the imperfect manufacturing of sensors, including both speakers and microphones. These physical differences introduce diverse non-uniform noise patterns, and the signals from different smartphones tend to have different data distributions. Thus, it is non-trivial to investigate the robustness of the proposed model on different data collection devices.

Distance. The distance influences FAS performance as the SNR of the received acoustic signal tends to be lower as the distance becomes larger. According to our investigations, the comfortable distance from the user's nose to the phone in people's daily usage is around 25-45 cm. We set three data collection distances of 25 cm, 35 cm, and 45 cm during the data collection process.

Ambient Noise. Ambient noise is also a key factor impacting FAS performance as it degrades the SNR of the received acoustic signal. Moreover, ambient noise ubiquitously exists in people's daily usage, so that our dataset is required to consider this aspect. We set three ambient noise levels by controlling another device to play audios (e.g., songs and BBC news) in different volumes. We install a noise detector APP on the data collection smartphone to precisely monitor the ambient noise levels. In this dataset, three noise levels have been set as 40 dB, 60 dB, and 70 dB, corresponding to quiet, little noisy, and very noisy environments in real-world scenarios.

Pitch. To accommodate diverse usage scenarios, we further introduce different pitches in our dataset. Pitches affect the collected geometric information because relative positions between face regions and the phone have altered. Relative pitch angles between the smartphone and human face are set as −10 degrees, 0 degrees, and +10 degrees, corresponding to different holding habits of users.

A.3. Framework Design for Acoustic-Based FAS

Advantageously, the main idea of the disclosed Echo-FAS system for enhancing the FAS performance is to combine global frequency features and local frequency features of the presented face as derived from a reflected acoustic signal (as reflected from the face). This section discloses a novel two-branch Echo-FAS framework, which combines the global and local frequency features of an input signal as captured by the microphone of the smartphone, leading to high-accuracy face liveness detection. The framework is elaborated as follows with the aid of FIG. 5, which depicts a block diagram illustrating a signal-processing procedure of processing the received acoustic signal.

Figure 5:
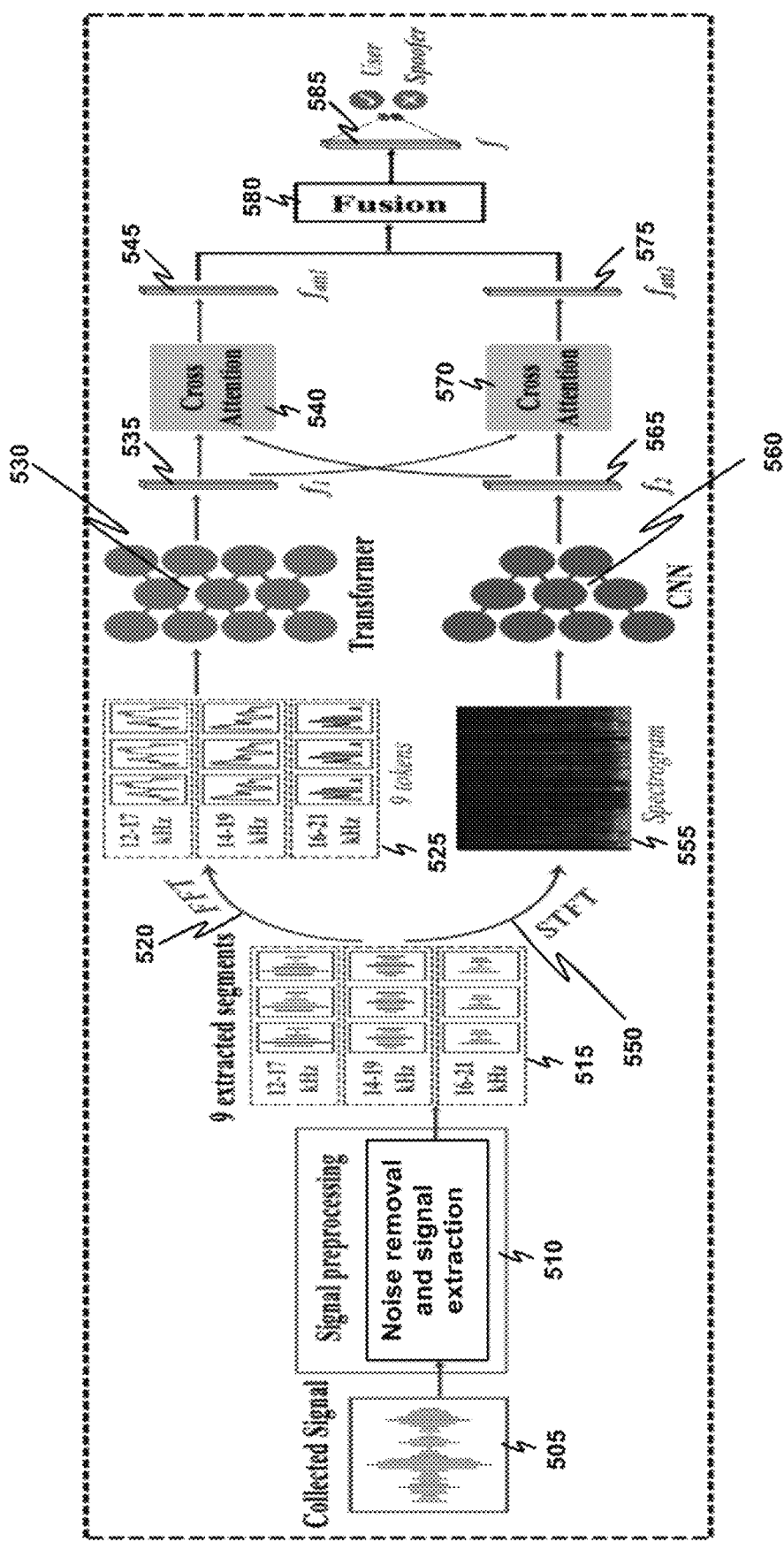
FIG. 5 provides a schematic diagram of a two-branch Echo-FAS pipeline for processing a reflected acoustic signal collected by a microphone, where the upper branch and lower branch are used to calculate a global frequency feature and a local frequency feature, respectively, of a target face.

As illustrated in FIG. 5, an acoustic signal 505 collected by a device, such as a smartphone, is first fed to a signal preprocessing module 510 for conditioning the signal 505 with signal-processing operations to yield nine extracted signal segments 515. The signal preprocessing module 510 includes noise removal and signal extraction.

Note that Echo-FAS uses one microphone to collect the acoustic signal 505 for signal processing and analysis, where the collected acoustic signal 505 is a result of using a speaker to emit the designed acoustic signal as described above. The collected signal 505 contains three major components: a direct transmission signal, which is a first portion of the designed acoustic signal as directly transmitted from the speaker to the microphone; a target face echo, which is a reflected acoustic signal reflected from the face upon receiving the designed acoustic signal; and a background echo, which is a second portion of the designed acoustic signal as reflected from objects far away from the face. The main function of the signal preprocessing module 510 is to eliminate the direct transmission signal and background echo from the collected signal 505, and extract the target face echo to yield the nine extracted signal segments 515.

First, the signal preprocessing module 510 is synchronized with the collected signal 505 by utilizing the pilot embedded therein, so that a time boundary of the first chirp is identified. After synchronization, we apply a low-pass filter on the residual signal to remove ambient noise under 12 kHz. The signal then can be split into nine short clips.

Second, the direct transmission signal and the background echo are removed or filtered off from the nine short clips of the collected signal 505. The direct transmission signal is expected to be higher in power, and earlier to arrive at the microphone, than the target face echo. The background echo is similarly expected to be much lower in power, and has a much longer delay, than the target face echo. Based on these differences among the direct transmission signal, target face echo and background echo, the target face echo can be distinguished and extracted from the direct transmission signal and background echo based on matched filtering the collected signal 505 with the designed acoustic signal.

Third, the target face echo left in the nine short clips forms the nine extracted signal segments 515, corresponding to three different frequency sweep ranges.

Echo-FAS processes the nine extracted signal segments 515 in the frequency domain as the collected signal 505 that is recorded is uneven over different frequencies, thus presenting significant distinguishable clues for classifying an input query between live and spoof face. This phenomenon is mainly caused by two factors: (a) the target surface's absorption of the signal; and (b) the phenomenon that the mixed echoes with different phases may be constructive at some frequencies while destructive at other frequencies.

In Echo-FAS, a two-branch framework is designed to generate a global frequency feature and a local frequency feature of the target face. The global and local frequency features are combined to form an enriched feature for enhancing the FAS performance.

In the first branch for generating the global frequency feature, a FFT operation 520 is applied to each of the nine extracted signal segments 515 to form nine frequency segments 525, which are regarded as nine tokens 525. Note that FFT can reflect the global frequency statistics of each signal segment. The nine tokens 525 are then collectively analyzed to generate the global frequency feature. In the art, a transformer, which is a machine-learning model and is primarily used in the fields of natural language processing and computer vision, is known to draw global dependencies between input and output. For information on the transformer model, see, e.g., [5]. Thus, the first branch employs a transformer model 530 to extract the global frequency feature 535 of the nine input tokens 525. The cascaded self-attention modules in the transformer model 530 can effectively capture long-distance feature dependencies while tending to ignore local feature details.

In the second branch for generating the local frequency feature, a STFT operation 550 is applied to of a signal sequence comprised of the nine extracted signal segments 515 to form a spectrogram 555. According to the frequency sweep rationale of the designed acoustic signal, for each chirp signal, the frequency of the emitted acoustic signal for probing the target face linearly increases over time. As such, the STFT operation 550 is employed to analyze the frequency content of local windows of the nine extracted signal segments 515. In the art, numerous works have demonstrated that convolution operations in a CNN are good at extracting local features but experience difficulty in capturing global representations. Therefore, a CNN 560 is employed with an advantage to complementarily mine more local informative clues in the second branch. After the spectrogram 555 is generated by the STFT operation 550, the CNN 560 is subsequently used to process the spectrogram 555. The local frequency feature 565 is then extracted.

Finally, two cross attention modules 540, 570 are devised to model the correlations of the extracted global and local frequency features 535, 565. The global and local frequency features 535, 565 are then combined by the two cross attention modules 540, 570 to give two attended features 545, 575. The two attended features 545, 575 are further combined by a fusion operation 580 to form an enriched feature 585 of the target face. The enriched feature 585 is used to determine whether the input query (namely, the target face) is a live person or a spoofer.

The framework is trained in an end-to-end manner and supervised by the cross-entropy loss between the prediction result ĉ and ground truth label c:

$$L_c = -\frac{1}{N}\sum_{i=1}^{N}(c_i \log \hat{c}_i + (1-c_i)\log(1-\hat{c}_i)). \quad (1)$$

B. Details of Embodiments of Present Invention

Embodiments of the present invention are elaborated as follows based on the details, examples, applications, etc., as disclosed above in Section A for Echo-FAS.

Although Echo-FAS as disclosed in Section A is primarily designed to be implemented in a smartphone as an exemplary case of using the present invention, the present invention is not limited only to applications with the smartphone. The present invention may be implemented in a desktop computer, a tablet computer, a point-of-sale terminal at which face authentication is also implemented, etc. In addition, although Echo-FAS as disclosed in Section A is based on using an acoustic signal (the designed signal) having a frequency content mostly within a hearing range (commonly given as 20 to 20,000 Hz) for probing a presented face, the present invention is not limited to using a probing acoustic signal within the hearing range. The present invention may use a probing acoustic signal having some or all frequency content in the ultrasonic range, provided appropriate hardware in ultrasound generation and reception is installed in Echo-FAS.

A first aspect of the present invention is to provide a method for detecting liveness of a presented face. Determination of the liveness of the presented face is essential for FAS. The method is illustrated with the aid of FIG. 6, which depicts a process 600 for detecting liveness of the presented face in accordance with an exemplary embodiment of the disclosed method.

In step 610, a first acoustic signal is generated and is projected onto the presented face for probing the presented face. By probing the presented face, geometrical information of the presented case is obtainable. The first acoustic signal comprises a plurality of time-limited chirps. An individual time-limited chirp has a finite time duration, and is a FMCW within the time duration. When the presented face receives the individual time-limited chirp, it causes a face-echo signal to be reflected from the presented face. That is, the face-echo signal is an acoustic response of the presented face due to the individual time-limited chirp. As a result, a plurality of face-echo signals is created for the plurality of time-limited chirps.

Note that the face-echo signal is different from a target face echo as mentioned above in that the target face echo is an acoustic response of the presented face due to the entire first acoustic signal while the face-echo signal is the response due to the individual time-limited chirp.

Although nine time-limited chirps are used in the Echo-FAS system of Section A, the present invention is not limited only to using this number of time-limited chirps. The number of different time-limited chirps in the plurality of time-limited chirps may be any positive number as determined appropriate by those skilled in the art according to the practical situation of using the process 600.

In step 620, a second acoustic signal for capturing an acoustic response of the presented face due to the first acoustic signal is received or recorded. Note that the plurality of face-echo signals is embedded in the second acoustic signal.

After the second acoustic signal is received in the step 620, the received second acoustic signal is preprocessed to yield a plurality of extracted signal segments in step 630. In particular, the preprocessing of the received second acoustic signal includes extracting the plurality of face-echo signals from the received second acoustic signal such that an individual extracted signal segment contains a corresponding face-echo signal.

Figures 7, 8:
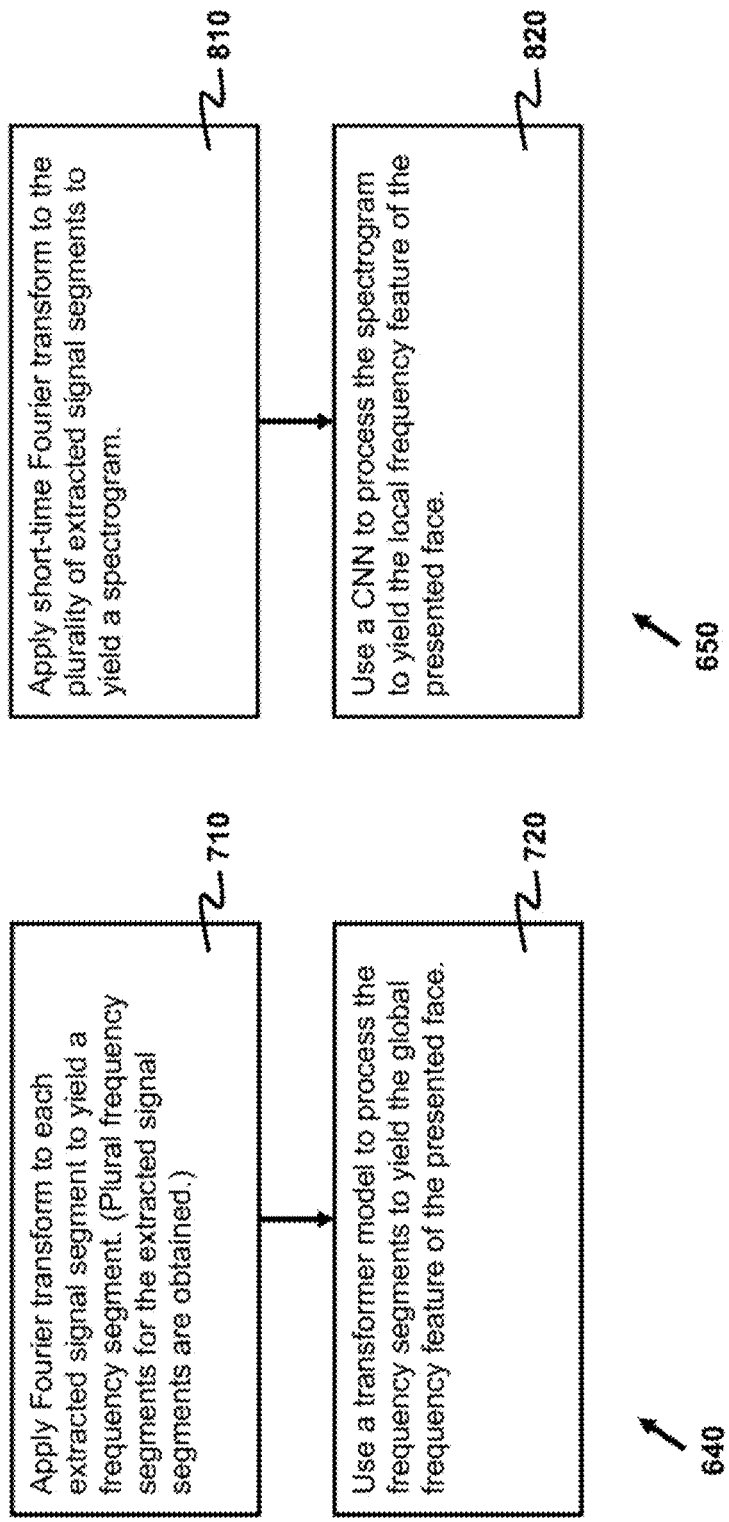
FIG. 7 depicts exemplary steps for generating a global frequency feature of the presented face as used in the process of FIG. 6, illustrating that a FT and a machine-learning transformer model are used in the generation of the global frequency feature.
FIG. 8 depicts exemplary steps for generating a local frequency feature of the presented face as used in the process of FIG. 6, illustrating that a STFT and a CNN are used in the generation of the local frequency feature.

After the plurality of extracted signal segments is obtained, global and local frequency features of the presented face are computed in steps 640 and 650, respectively. FIGS. 7 and 8 depict exemplary steps used in the steps 640 and 650, respectively.

The step 640 includes steps 710 and 720. In the step 710, a FT is applied to the individual extracted signal segment to yield a frequency segment. As a result, a plurality of frequency segments for the plurality of extracted signal segments is obtained. Preferably, the FT is realized by FFT, although other forms of FT, such as discrete Fourier transform, may be used. In the step 720, the plurality of frequency segments is processed with a machine-learning transformer model to yield the global frequency feature of the presented face. The transformer model may be a classical one as proposed in [5], or a variant thereof, such as a global representation enhanced transformer [6].

The step 650 includes steps 810 and 820. In the step 810, a STFT is applied to the plurality of extracted signal segments to yield a spectrogram. In the step 820, the spectrogram is processed with a CNN to yield the local frequency feature of the presented face.

Figure 6:
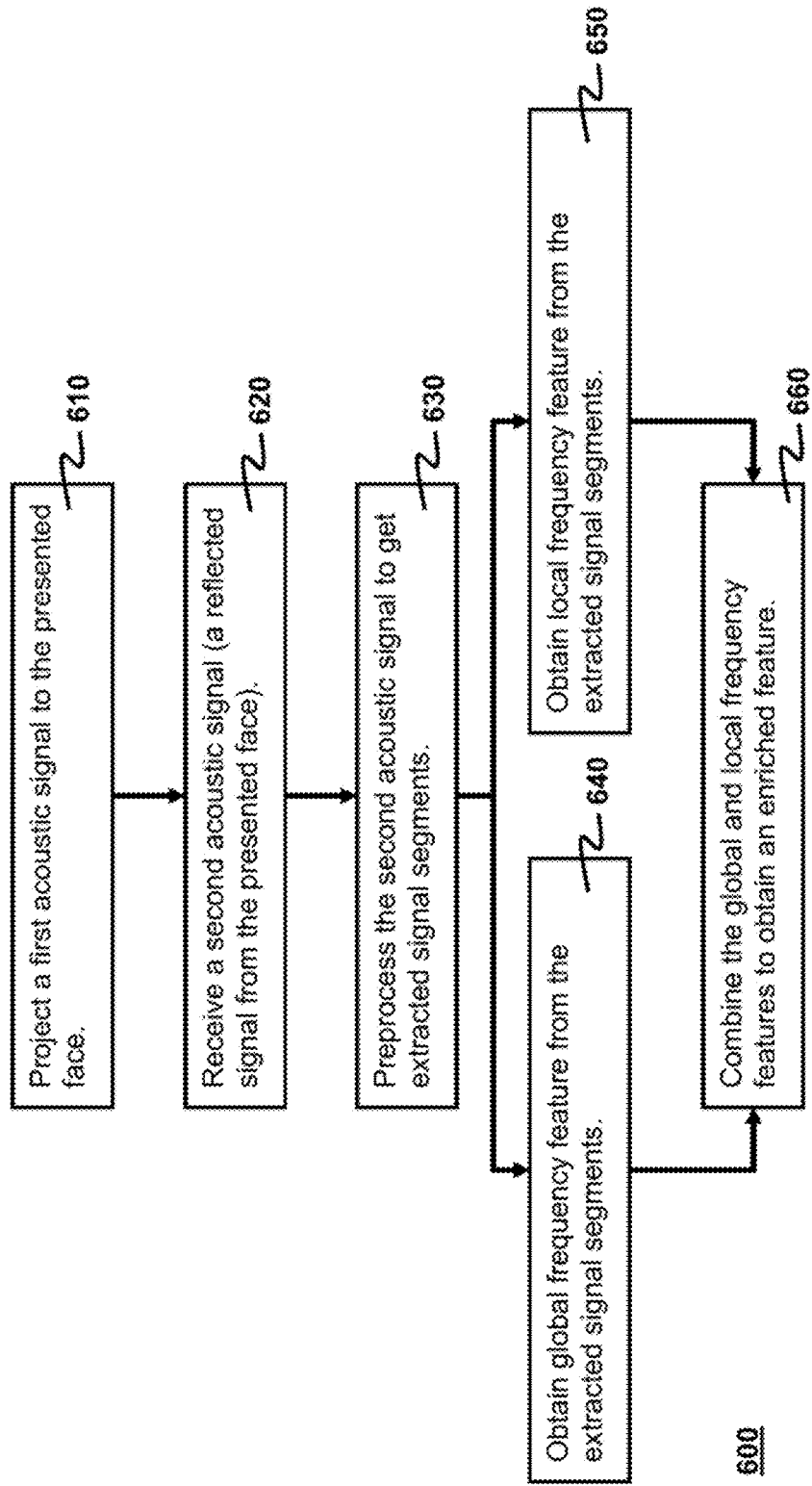
FIG. 6 depicts a process for detecting liveness of a presented face in accordance with an exemplary embodiment of the present invention, thereby illustrating a method as disclosed herein for detecting liveness of the presented face.

Refer to FIG. 6. In step 660, the global and local frequency features as obtained in the steps 640 and 650 are combined to yield an enriched feature of the presented face. The enriched feature is used for determining whether the presented face is a genuine face or a spoofer.

Other implementation details of the process 600 are provided as follows.

As one practical realization of the first acoustic signal, the individual time-limited chirp may be selected to have a bandwidth of 5 kHz. In another practical realization, the plurality of time-limited chirps may be designed such that the plurality of time-limited chirps collectively covers a frequency span from 12 kHz to 21 kHz. In certain embodiments, the individual time-limited chirp has a frequency sweep range selected from a first range of 12-17 kHz, a second range of 14-19 kHz, and a third range of 16-21 kHz.

It is preferable that in extracting the plurality of face-echo signals from the received second acoustic signal in the step 630, one or more noise components are removed from the second acoustic signal while keeping the plurality of face-echo signals in the second acoustic signal. Preferably, the one or more noise components to be removed include a direct transmission signal formed as a first portion of the first acoustic signal as directly transmitted from a sound generator to a sound receiver, where the sound generator emits the first acoustic signal, and the sound receiver receives the second acoustic signal. It is also preferable that the one or more noise components to be removed further include a background echo formed as a second portion of the first acoustic signal as reflected from objects far away from the presented face.

In generating the first acoustic signal in the step 610, it is advantageous and preferable that the first acoustic signal further comprises a pilot for assisting time synchronization in processing the second acoustic signal, where the pilot is transmitted before the plurality of time-limited chirps in the first acoustic signal. The pilot is utilized in the step 630. The preprocessing of the received second acoustic signal further includes performing time synchronization with the received second acoustic signal by locating the pilot in the second acoustic signal. In certain embodiments, the pilot is a tone having a frequency of 11.025 kHz.

In the step 630, it is preferable that the preprocessing of the received second acoustic signal further includes filtering a residual signal with a low-pass filter to remove ambient noise in the residual signal after time synchronization is accomplished, where the residual signal is a portion of the second acoustic signal after the pilot is removed. In certain embodiments, the low-pass filter is configured to remove ambient noise below 12 kHz.

As one representative case used for illustrating the present invention, FIG. 6 depicts that the steps 640 and 650 for respectively computing the global and local frequency features are executed in parallel. However, the present invention is not limited only to executing the steps 640 and 650 in parallel. It is possible that the two steps are executed in series. In practical situations, whether parallel or serial execution is chosen often depends on whether sufficient computation resources are available for running the transformer model and the CNN in parallel.

Note that the steps 640 and 650 are executed only after the transformer model and CNN are trained. Training of the two machine-learning models is accomplished by conducting a full-scale training of the two models with a training dataset, or alternatively via a short-cut route of loading model parameters/weights to the two models if these model parameters/weights are available from a previous training session.

Figure 9:
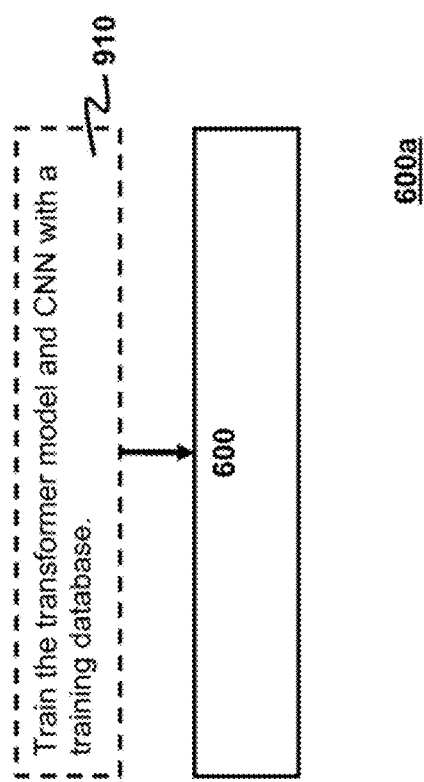
FIG. 9 depicts a modified process, modified from the process of FIG. 6, for taking into account a possible need for training the transformer model and CNN.

FIG. 9 depicts a flowchart showing a modified process 600*a*, modified from the process 600, for taking into account a possible need for training the two machine-learning models. In particular, the modified process 600*a* executes an optional training step (step 910) before execution of the process 600. In the optional step 910, the transformer model and CNN are trained with a training database. The training database may be developed similar to the development of Echo-Spoof database as disclosed above. The transformer model and CNN may be trained in parallel or in series.

In realizing the process 600 or the modified process 600*a*, a sound generator is used in the step 610 to generate the first acoustic signal, and sound receiver is used in the step 620 to receive the second acoustic signal. The sound generator may be a speaker or a plurality of speakers. The sound receiver may be a microphone or an array of microphones. In case the first acoustic signal contains ultrasonic components, the sound generator and the sound receiver may be selected to be one or more ultrasonic transducers and one or more ultrasonic sensors, respectively. It is also possible to employ other choices of sound generator and sound receiver as determined appropriate by those skilled in the art according to practical situations in realizing the process 600 or the modified process 600*a*.

In realizing the process 600 or the modified process 600*a*, one or more computing processors are used to execute the steps 630, 640, 650 and 660.

Of practical advantage, the disclosed method for detecting liveness of the presented face may be used with a conventional RGB-based FAS model for increasing effectiveness and robustness in FAS. Under uncontrollable environmental conditions in real-world application scenarios, RGB modality-based FAS models are prone to suffer significant detection performance drops due to domain gaps between the training and testing data sample distributions. On the other hand, the disclosed method can capture surface geometric information of the presented face. Moreover, such geometric information can reflect the depth, which can hardly be learned from RGB data. Thus, it is reasonable to flexibly assemble the disclosed method with the RGB modality to conduct a more generalized face liveness detection and improve the robustness of the RGB-based model.

As a summary remark, the disclosed method advantageously leverages existing hardware on a typical mobile computing device (in particular a smartphone), and can be flexibly allied with RGB-based FAS models to improve FAS RGB-based detection methods.

Figure 10:
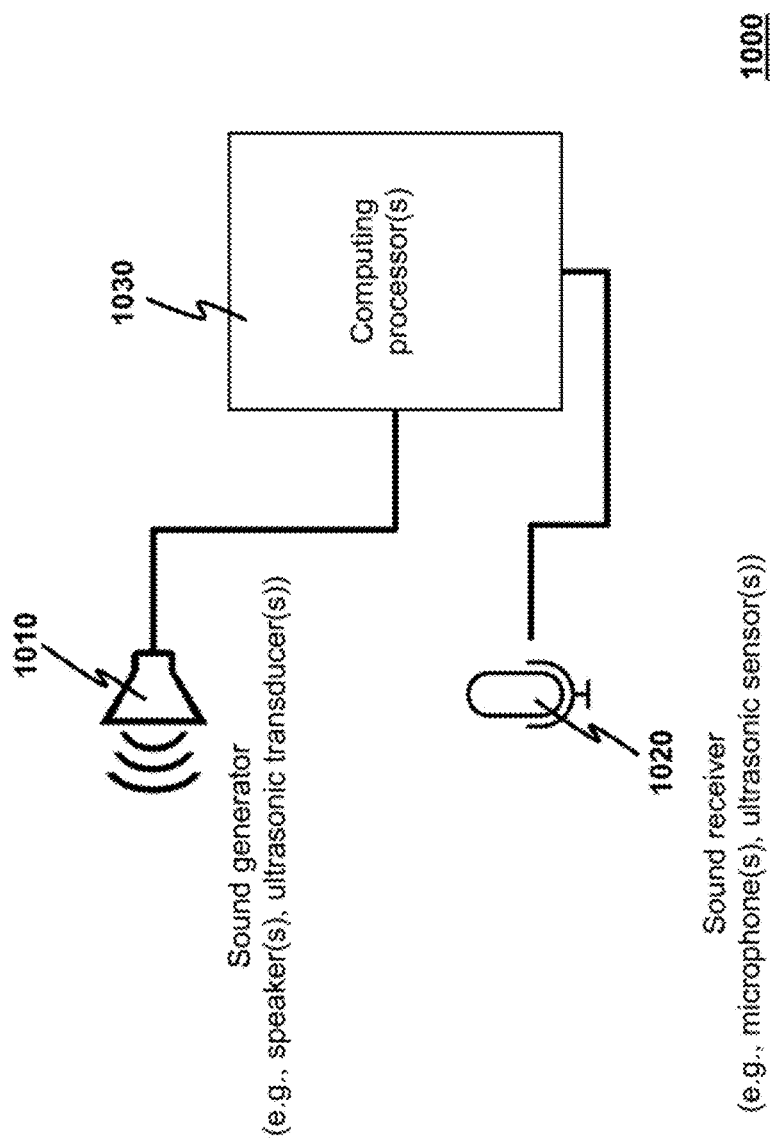
FIG. 10 depicts a block diagram of an exemplary FAS system for detecting liveness of a presented face.

A second aspect of the present invention is to provide a FAS system for detecting liveness of a presented face. The disclosed FAS system is complementary to the method disclosed above, and is developed to apply any of the embodiments of the disclosed method to detect liveness of the presented face. FIG. 10 depicts an exemplary FAS system 1000.

The system 1000 comprises a sound generator 1010, a sound receiver 1020 and one or more computing processors 1030. The sound generator 1010 is used for generating the first acoustic signal and projecting the generated first acoustic signal onto the presented face for probing the presented face. The sound receiver 1020 is used for receiving the second acoustic signal for capturing an acoustic response of the presented face due to the first acoustic signal. The one or more computing processors 1030 are communicable with the sound generator 1010 and the sound receiver 1020. In addition, the one or more computing processors 1030 are configured or programmed to execute a computing-and-controlling process for controlling the sound generator 1010 and sound receiver 1020 and for detecting liveness of the presented face. The computing-and-controlling process includes: controlling the sound generator 1010 to execute the step 610; controlling the sound receiver 1020 to execute the step 620; and executing the steps 630, 640, 650 and 660. Optionally, the computing-and-controlling process further includes executing the step 910.

The system 1000 may be implemented in a desktop computer, a mobile computing device, a point-of-sale terminal, etc. The mobile computing device may be a smartphone, a tablet computer, a notebook computer, etc. The system 1000 may also be implemented as a distributed system. For example, if a smartphone is backed-up by an Internet-connected server programmed with the transformer model and CNN, the system 1000 is distributed over the smartphone and server.

In one practical application of the FAS system 1000, the system 1000 is implemented in a smartphone. The sound generator 1010 is realized by one or more speakers, and the sound receiver 1020 is realized by one or more microphones. Preferably, the sound generator 1010 is a single speaker, and the sound receiver 1020 is a single microphone. This setting on the sound generator 1010 and sound receiver 1020 is used by Echo-FAS.

The present disclosure may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

REFERENCES

There follows a list of references that are occasionally cited in the specification. Each of the disclosures of these references is incorporated by reference herein in its entirety.
[1] W. Xu, J. Liu, S. Zhang, Y. Zheng, F. Lin, J. Han, F. Xiao, and K. Ren, "Rface: Anti-spoofing facial authentication using cots rfid," in *Proceedings of IEEE INFOCOM 2021-IEEE Conference on Computer Communications*, IEEE, 2021, pp. 1-10.
[2] H. Chen, W. Wang, J. Zhang, and Q. Zhang, "Echoface: Acoustic sensor-based media attack detection for face authentication," *IEEE Internet of Things Journal*, vol. 7, no. 3, pp. 2152-2159, 2019.
[3] B. Zhou and F. Ye "System and Method Associated with User Authentication Based on an Acoustic-Based Echo-Signature", 2020, US Patent Application Publication No. 2020/0309930 A1, published Oct. 1, 2020.
[4] B. Zhou, Z. Xie, Y. Zhang, J. Lohokare, R. Gao, and F. Ye, "Robust human face authentication leveraging acoustic sensing on smartphones," *IEEE Transactions on Mobile Computing*, vol. 21, issue 8, pp. 3009-3023, August 2022.
[5] A. Vaswani, N. Shazeer, N. Parmar, J. Uszkoreit, L. Jones, A. N. Gomez, L. Kaiser and I. Polosukhin, "Attention is All you Need," in *Proceedings of Advances in Neural Information Processing Systems* 30 (*NIPS* 2017).
[6] R. Weng, H. Wei, S. Huang, H. Yu, L. Bing, W. Luo and J. Chen, "GRET: Global Representation Enhanced Transformer," in *Proceedings of The Thirty-Fourth AAAI Conference on Artificial Intelligence (AAAI-*20), pp. 9258-9265, Feb. 24, 2020.

What is claimed is:

1. A method for detecting liveness of a presented face, the method comprising:
generating a first acoustic signal and projecting the generated first acoustic signal onto the presented face for probing the presented face, wherein the first acoustic signal comprises a plurality of time-limited chirps, causing a face-echo signal to be reflected from the presented face when the presented face receives an individual time-limited chirp, whereby a plurality of face-echo signals is created for the plurality of time-limited chirps;
receiving a second acoustic signal for capturing an acoustic response of the presented face due to the first acoustic signal, wherein the plurality of face-echo signals is embedded in the second acoustic signal;
preprocessing the received second acoustic signal to yield a plurality of extracted signal segments, wherein the preprocessing of the second acoustic signal includes extracting the plurality of face-echo signals from the received second acoustic signal such that an individual extracted signal segment contains a corresponding face-echo signal;
applying a Fourier transform (FT) to the individual extracted signal segment to yield a frequency segment, whereby a plurality of frequency segments for the plurality of extracted signal segments is obtained;
processing the plurality of frequency segments with a machine-learning transformer model to yield a global frequency feature of the presented face;
applying a short-time Fourier transform (STFT) to the plurality of extracted signal segments to yield a spectrogram;
processing the spectrogram with a convolutional neural network (CNN) to yield a local frequency feature of the presented face; and
combining the global and local frequency features to yield an enriched feature of the presented face for determining whether the presented face is a genuine face or a spoofer.

2. The method of claim 1, wherein the FT is realized by a fast Fourier transform (FFT).

3. The method of claim 1, wherein the individual time-limited chirp has a bandwidth of 5 kHz.

4. The method of claim 1, wherein the plurality of time-limited chirps collectively covers a frequency span from 12 kHz to 21 kHz.

5. The method of claim 4, wherein the individual time-limited chirp has a frequency sweep range selected from a first range of 12-17 kHz, a second range of 14-19 kHz, and a third range of 16-21 kHz.

6. The method of claim 1, wherein in extracting the plurality of face-echo signals from the received second acoustic signal, one or more noise components are removed from the second acoustic signal while keeping the plurality of face-echo signals in the second acoustic signal.

7. The method of claim 6, wherein the one or more noise components include:
a first portion of the first acoustic signal as directly transmitted from a sound generator to a sound receiver without visiting the presented face, the sound generator being used to emit the first acoustic signal, the sound receiver being used to receive the second acoustic signal; and
a second portion of the first acoustic signal as reflected from objects far away from the presented face.

8. The method of claim 1, wherein:
the first acoustic signal further comprises a pilot for assisting time synchronization in processing the second acoustic signal, the pilot being transmitted before the plurality of time-limited chirps in the first acoustic signal; and
the preprocessing of the second acoustic signal further includes performing time synchronization with the received second acoustic signal by locating the pilot in the second acoustic signal.

9. The method of claim 1 further comprising:
training the transformer model with a training database before the transformer model processes the plurality of frequency segments; and training the CNN with the training database before the CNN processes the spectrogram.

10. A face anti-spoofing (FAS) system for detecting liveness of a presented face, the FAS system comprising:
- a sound generator for generating a first acoustic signal and projecting the generated first acoustic signal onto the presented face for probing the presented face;
- a sound receiver for receiving a second acoustic signal for capturing an acoustic response of the presented face due to the first acoustic signal; and
- one or more computing processors communicable with the sound generator and the sound receiver, the one or more computing processors being configured to:
  - control the sound generator to generate the first acoustic signal for projection to the presented face, wherein the first acoustic signal comprises a plurality of time-limited chirps, causing a face-echo signal to be reflected from the presented face when the presented face receives an individual time-limited chirp, whereby a plurality of face-echo signals is created for the plurality of time-limited chirps, and the plurality of face-echo signals is embedded in the second acoustic signal;
  - receive the second acoustic signal from the sound receiver;
  - preprocess the received second acoustic signal to yield a plurality of extracted signal segments, wherein the preprocessing of the received second acoustic signal includes extracting the plurality of face-echo signals from the received second acoustic signal such that an individual extracted signal segment contains a corresponding face-echo signal;
  - apply a Fourier transform (FT) to the individual extracted signal segment to yield a frequency segment, whereby a plurality of frequency segments for the plurality of extracted signal segments is obtained;
  - process the plurality of frequency segments with a machine-learning transformer model to yield a global frequency feature of the presented face;
  - apply a short-time Fourier transform (STFT) to the plurality of extracted signal segments to yield a spectrogram;
  - process the spectrogram with a convolutional neural network (CNN) to yield a local frequency feature of the presented face; and
  - combine the global and local frequency features to yield an enriched feature of the presented face for determining whether the presented face is a genuine face or a spoofer.

11. The FAS system of claim 10, wherein the FT is realized by a fast Fourier transform (FFT).

12. The FAS system of claim 10, wherein the individual time-limited chirp has a bandwidth of 5 kHz.

13. The FAS system of claim 10, wherein the plurality of time-limited chirps collectively covers a frequency span from 12 kHz to 21 kHz.

14. The FAS system of claim 13, wherein the individual time-limited chirp has a frequency sweep range selected from a first range of 12-17 kHz, a second range of 14-19 kHz, and a third range of 16-21 kHz.

15. The FAS system of claim 10, wherein in extracting the plurality of face-echo signals from the received second acoustic signal, one or more noise components are removed from the second acoustic signal while keeping the plurality of face-echo signals in the second acoustic signal.

16. The FAS system of claim 15, wherein the one or more noise components include:
- a first portion of the first acoustic signal as directly transmitted from the sound generator to the sound receiver without visiting the presented face; and
- a second portion of the first acoustic signal as reflected from objects far away from the presented face.

17. The FAS system of claim 10, wherein:
- the first acoustic signal further comprises a pilot for assisting time synchronization in processing the second acoustic signal, the pilot before transmitted before the plurality of time-limited chirps in the first acoustic signal; and
- the preprocessing of the received second acoustic signal further includes performing time synchronization with the received second acoustic signal by locating the pilot in the second acoustic signal.

18. The FAS system of claim 10, wherein the one or more computing processors are further configured to:
- train the transformer model with a training database before the transformer model processes the plurality of frequency segments; and
- train the CNN with the training database before the CNN processes the spectrogram.

19. A smartphone comprising the FAS system of claim 10, wherein the sound generator is realized by one or more speakers, and the sound receiver is realized by one or more microphones.

20. The smartphone of claim 19, wherein the sound generator is a single speaker, and the sound receiver is a single microphone.

* * * * *